(12) United States Patent
Manninen et al.

(10) Patent No.: US 9,457,539 B2
(45) Date of Patent: Oct. 4, 2016

(54) COMPLIANT SLIT FILM SEAMING ELEMENT

(71) Applicant: AstenJohnson, Inc., Charleston, SC (US)

(72) Inventors: Allan R. Manninen, Stittsville (CA); Hongjian Zhou, Kanata (CA)

(73) Assignee: AstenJohnson, Inc., Charleston, SC (US)

( * ) Notice: Subject to any disclaimer, the term of this patent is extended or adjusted under 35 U.S.C. 154(b) by 0 days.

(21) Appl. No.: 14/766,278

(22) PCT Filed: Jan. 30, 2014

(86) PCT No.: PCT/CA2014/000072
§ 371 (c)(1),
(2) Date: Aug. 6, 2015

(87) PCT Pub. No.: WO2014/121373
PCT Pub. Date: Aug. 14, 2014

(65) Prior Publication Data
US 2015/0375476 A1    Dec. 31, 2015

(30) Foreign Application Priority Data

Feb. 7, 2013    (CA) ...................................... 2805366

(51) Int. Cl.
*D21F 7/10*    (2006.01)
*B32B 7/04*    (2006.01)
(Continued)

(52) U.S. Cl.
CPC . *B32B 7/04* (2013.01); *B32B 3/04* (2013.01); *B32B 3/08* (2013.01); *B32B 5/022* (2013.01); *B32B 5/024* (2013.01); *D06H 5/00* (2013.01); *D21F 1/0054* (2013.01); *F16G 3/02* (2013.01); *F16G 3/10* (2013.01)

(58) Field of Classification Search
CPC .............. D21F 7/10; D21F 1/12; F16G 3/02; B32B 3/04; Y10S 162/904
USPC ........................................................ 428/124
See application file for complete search history.

(56) References Cited

U.S. PATENT DOCUMENTS 4,558,492 A * 12/1985 Hite ......................... F16G 3/02
                                                              198/847
4,719,788 A    1/1988  Musil
5,182,933 A    2/1993  Schick

FOREIGN PATENT DOCUMENTS

CA    2700767 A1    10/2011
CA    2758622 A1    5/2013

OTHER PUBLICATIONS

International Search Report and Written Opinion dated Apr. 29, 2014 for International Application No. PCT/CA2014/000072, International Filing Date: Jan. 30, 2014 consisting of 10-pages.
(Continued)

*Primary Examiner* — Alexander Thomas
(74) *Attorney, Agent, or Firm* — Christopher & Weisberg, P.A.

(57) ABSTRACT

Disclosed herein is a seaming element for attachment to an industrial textile. The industrial textile has opposed first and second seamable edge regions, while the seaming element has: i) a first lateral edge; ii) a second lateral edge; iii) a trailing edge; iv) a forward portion comprising a plurality of protruding seaming with successive loops spaced apart by an aperture, and v) a rearward portion continuous with the forward portion, with the rearward portion comprising an upper member and a lower member. The upper and lower members are substantially planar and have mutually opposed inner surfaces, with a portion of each inner surface bonded to the industrial textile at a selected one of the first and second seamable edge regions. At least one of the upper and lower member comprises one or more slits between the first lateral edge and the second lateral edge, with the one or more slits extending from the respective trailing edge in a direction towards the forward portion of the seaming element.

19 Claims, 11 Drawing Sheets

(51) Int. Cl.
*F16G 3/02* (2006.01)
*D21F 1/00* (2006.01)
*F16G 3/10* (2006.01)
*B32B 3/04* (2006.01)
*B32B 3/08* (2006.01)
*B32B 5/02* (2006.01)
*D06H 5/00* (2006.01)

(56) References Cited

OTHER PUBLICATIONS

International Preliminary Report on Patentability dated Jul. 7, 2015 for International Application No. PCT/CA2014/000072, International Filing Date Jan. 30, 2014 consisting of 13-pages.

\* cited by examiner

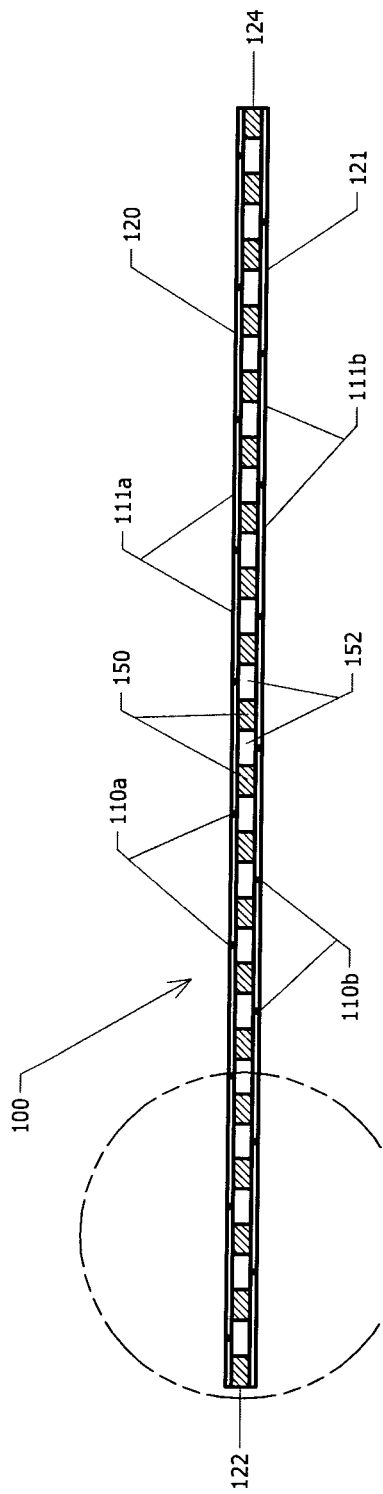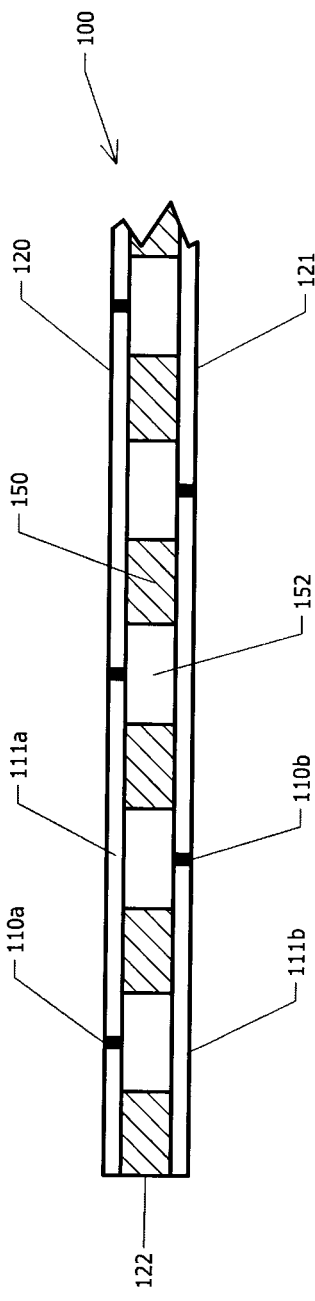
FIGURE 3
FIGURE 4

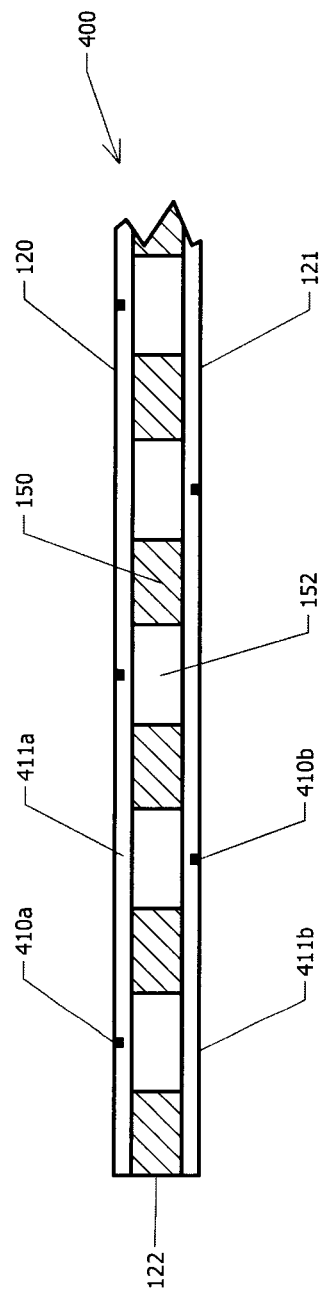
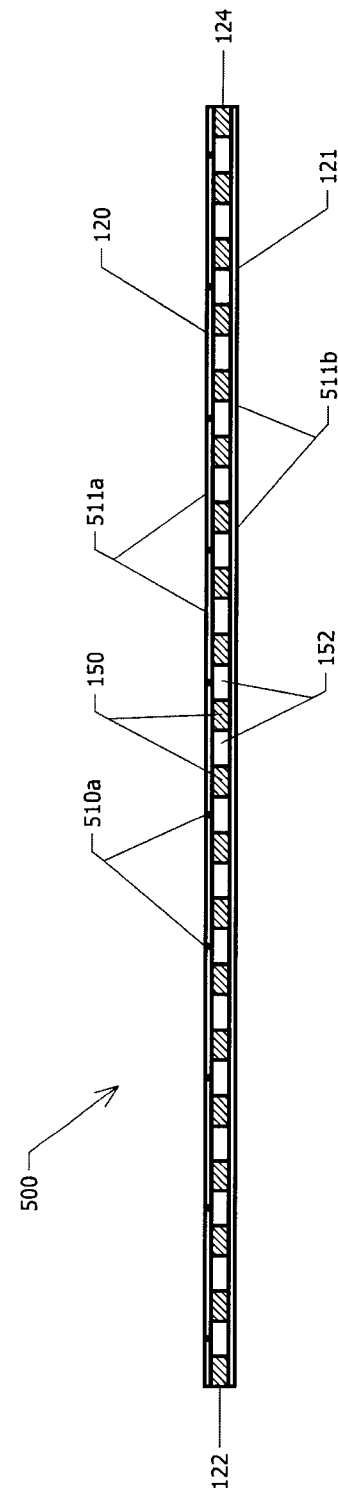
FIGURE 9
FIGURE 10

COMPLIANT SLIT FILM SEAMING ELEMENT

CROSS-REFERENCE TO RELATED APPLICATIONS

This application is a submission under 35 U.S.C. §371 for U.S. National Stage Patent Application of, and claims priority to, International Application Number PCT/CA2014/000072, entitled COMPLIANT SLIT FILM SEAMING ELEMENT, filed Jan. 30, 2014, which International Application is related to and claims priority to Canadian Application Serial No. 2,805,366, entitled COMPLIANT SLIT FILM SEAMING ELEMENT, filed Feb. 7, 2013, the entirety of all of which is incorporated herein by reference.

TECHNICAL FIELD

The present specification relates to seaming elements used to form a seam in woven or nonwoven industrial fabrics. In particular, it relates to seaming elements that are compliant or flexible in the plane of the fabric to provide secure attachment between the seaming element and the fabric.

BACKGROUND

Industrial textiles for use in filtration, separation and conveying applications such as papermaking have been in use for many years. The vast majority of these fabrics are typically woven from polymeric yarns such as monofilaments using large industrial looms. Following weaving, the textiles are further processed for use in particular applications. At this point, a seam is usually installed so that the fabrics may be joined on the machine for which they are intended. Many seam constructions are known and have been used; however, most require a significant amount of highly specialized personnel and/or machinery. For such woven textiles, the fabric ends must first be prepared so as to free a portion of the component yarns from the woven structure; these yarns are then either rewoven with yarns from the opposite end to form a woven seam, or they are interlaced in one of various ways with seam devices which accept a joining pin or pintle, such as coils and the like. These seam constructions are costly and time consuming to prepare. Similar disadvantages of time and cost apply to nonwoven industrial textiles, such as those constructed from one or more layers of film.

WO 2010/121360 (Manninen) discloses a seaming element that can be attached to each of the two opposed fabric ends, thereby forming a seam in an industrial textile. The textile is typically cut straight across its width perpendicular to the intended running direction of the finished fabric. The seaming element is then bonded either over, or between, layers of the component yarns or film. The bonding method may include through transmission laser welding (TTLW). After the seaming element is bonded in position, the finished fabric is ready for installation on the machine for later use. The seaming element varies from 0.5 m to 6 m in length, and is made from a polymeric material. In one embodiment, the seaming element has a U-shape, which is slipped over each end of the prepared fabric and welded in place.

Other types of seaming element have been disclosed. For example, WO 2011/069258 (Manninen et al.) discloses a hinge type seaming element; PCT/CA2012/000701 (Manninen) discloses a fold-over type seaming element; PCT/CA2012/001138 (Manninen) discloses a multi-pin seaming element; and WO/2014/075170 (Manninen) discloses a roll formed seaming element including ridges.

U.S. Pat. No. 5,182,933 (Schick) and U.S. Pat. No. 4,942,645 (Musil) each disclose a fastener for securing the ends of belts, comprising upper and lower members that are connected at one edge by multiple arcuate loops that are separated by apertures. On the opposite edge, the fastener contains a series of webs that are riveted to the belt.

U.S. Pat. No. 4,719,788 (Musil) and Flexco®SR™ Rivet Hinged R9 Belt Fastener each disclose belt fasteners comprising an upper plate, a lower plate and loop shaped strap means for joining these plates. The upper or lower plate of these fasteners can be connected to the same plate of an adjacent fastener at rupturable bridges to form a fastener strip.

U.S. Pat. No. 6,216,851 (Mitas et al.) discloses a belt fastener element having upper and lower plates connected by arcuate hinge loops. Further, the lower plates are connected in a continuous manner while the upper plates are spaced apart.

It will be appreciated that during the bonding process, particularly when a TTLW bonding process is used, a reliable and high strength bond should be formed between the seaming element and the fabric component. TTLW requires intimate contact between the joining components in order to form a high strength bond. This can be difficult to achieve when a relatively large, solid object (such as the seaming element) is being bonded to relatively smaller and discrete units, such as the polymeric monofilament yarns of a woven fabric. Such yarns are often crimped and do not necessarily present a uniform, planar surface for welding. Similarly, nonwoven fabrics often have discontinuities and nonplanar irregularities, thereby reducing the necessary intimate contact between the seaming element and the nonwoven fabric.

It would be advantageous to render the bonding region of seaming elements flexible or compliant so that, during a bonding process, intimate contact can be made between the fabric components and the seaming element.

In addition, where a nonwoven textile is used, it would be advantageous to modify the attachment of the seaming element to the fabric so that the strength of the bond between the seaming element and the nonwoven textile is enhanced.

SUMMARY

Disclosed herein is a seaming element for attachment to an industrial textile. The seaming element will be first described in its general form, and then its implementation in terms of specific embodiments will be detailed thereafter. These embodiments are intended to demonstrate both the principle and optional features of the seaming element, and the manner of its implementation. The seaming element in its broadest and more specific forms will then be further described, and defined, in each of the individual claims that conclude this specification.

In one aspect of the present invention, there is provided a seaming element for an industrial textile, the industrial textile having opposed first and second seamable edge regions, the seaming element having: i) a first lateral edge; ii) a second lateral edge; iii) a trailing edge; iv) a forward portion comprising a plurality of protruding seaming loops with successive loops spaced apart by an aperture, and v) a rearward portion continuous with the forward portion, the rearward portion comprising an upper member and a lower member, the upper and lower members being substantially planar and having mutually opposed inner surfaces, with a portion of each inner surface bonded to the industrial textile at a selected one of the first and second seamable edge regions, wherein at least one of the upper and lower member comprises one or more slits between the first lateral edge and the second lateral edge, the one or more slits extending from the respective trailing edge in a direction towards the forward portion of the seaming element.

The seaming element and the industrial textile may each independently comprise a polymer; the polymer may be a thermoplastic. In addition, the seaming element may comprise a bi-axially oriented polyester.

Each of the upper and lower members of the seaming element may be bonded to the seamable edge region by a bonding method selected from the group consisting of: chemically reactive systems, adhesives, laser beam welding and ultrasonic welding. Furthermore, the seaming element may be bonded to the seamable edge region by through transmission laser welding (TTLW).

Each of the one or more slits may have a substantially linear configuration and may extend substantially normal to the respective trailing edge. In addition, the one or more slits may be evenly spaced between the first lateral edge and second lateral edge. Alternatively, the one or more slits may be randomly spaced between the first lateral edge and second lateral edge. At least one slit may be centrally aligned with one aperture.

In addition, at least one slit may extend partially through a thickness of the respective member, or may extend completely through a thickness of the member.

Where each of the upper and lower members comprises one or more slits, each of the one or more slits may be centrally aligned with a selected one of the apertures. In addition, each slit of the upper member may be aligned with a selected one of the slits of the lower member, and each slit of the lower member may be aligned with a selected one of the slits of the upper member. Alternatively, each slit of the upper member may be symmetrically laterally offset from an adjacent pair of slits of the lower member.

In another aspect of the present invention, there is provide a seaming element for an industrial textile, the industrial textile comprising a first polymer and having opposed first and second seamable edge regions, the seaming element comprising a second polymer and having: i) a first lateral edge; ii) a second lateral edge; iii) a trailing edge; iv) a forward portion comprising a plurality of protruding seaming loops with successive loops spaced apart by an aperture, and v) a rearward portion continuous with the forward portion, the rearward portion comprising an upper member and a lower member, the upper and lower members being substantially planar and having mutually opposed inner surfaces, with a portion of each inner surface bonded to the industrial textile at a selected one of the first and second seamable edge regions, wherein the upper and lower member each comprise a plurality of slits regularly spaced between the first lateral edge and the second lateral edge of the member, each slit extends from the respective trailing edge in a direction towards the forward portion of the seaming element; and each slit is centrally aligned with one of the apertures.

In the aforementioned seaming element, each slit of the upper member may be symmetrically laterally offset from an adjacent pair of slits of the lower member.

In addition, the industrial textile may comprise a thermoplastic; the seaming element may comprise a bi-axially oriented polyester; and the seaming element may be bonded to the seamable edge by a welding method selected from the group consisting of through transmission laser welding and ultrasonic welding.

In yet another aspect of the present invention, there is provided an industrial textile having opposed first and second seamable edge regions, each seamable edge region bonded to any one of the seaming elements described above.

In yet a further aspect of the present invention, there is provided a method of providing a seam to at least one seamable edge region of an industrial textile comprising: a) placing the industrial textile within any of the seaming elements described above; and b) bonding each of the upper and lower members of the seaming element to the seamable edge.

In the aforementioned method, the seaming element and the industrial textile may each independently comprise a polymer material; and the upper and lower members of the seaming element may each be bonded to the seamable edge by a bonding method selected from the group consisting of: chemically reactive systems, adhesives, laser beam welding and ultrasonic welding. The polymer material may be a thermoplastic and the bonding method may be through transmission laser welding.

The seaming element may comprise a polymeric material; the polymeric material may be a thermoplastic or thermoset material. Where the seaming element comprises a thermoplastic, the thermoplastic may be a bi-axially oriented thermoplastic, or a bi-axially oriented co-extruded material that can be welded by a laser. Herein, "bi-axially" implies orientation in both the machine direction (MD) and transverse direction (TD) of the thermoplastic material, such as a film.

The industrial textile may comprise a polymeric material; the polymeric material may be a thermoplastic or thermoset material.

Herein, the term "bonding" refers to the use of any one of: i) a chemically reactive system; ii) an adhesive; or iii) a welding process to attach two surfaces together. The welding process can include ultrasonic welding or laser beam welding, in particular through transmission laser welding (TTLW).

Where TTLW is used, both the seaming element and the industrial textile comprise a thermoplastic; the thermoplastic may comprise a polyester (for example, but not limited to, polyethylene terephthalate, or PET). In addition, where TTLW is used, the seaming element and/or the seamable end of the industrial textile include a radiant energy absorbent in order to allow for TTLW to bond the sealing element to the fabric.

Appropriate polymeric materials which are amenable to welding and would be appropriate for use as either yarns or films in both seaming elements and industrial textiles include, but are not limited to, polyethylene terephthalate (PET), hydrolysis stabilized PET, polybutylene terephthalate (PBT), polyethylene, polyethylene naphthalate (PEN), polypropylene (PP), polyphenylene sulphide (PPS), polyether ether ketone (PEEK) and other polymers such as would be appropriate for use in forming monofilament or film intended for use in industrial textiles such as paper machine clothing, including papermakers' dryer fabrics and the like. Various nylon polymers, such as polyamide 6, polyamide 6/6, polyamide 6/10 and the like, as well as their copolymers and blends thereof, may also be appropriate materials. These materials are all suitable for laser welding.

Both the seaming element and the industrial textile may also comprise thermoset plastics such as either linear or aromatic heterocyclic polyimides made from Apical™, Kapton™, UPILEX™, VTEC™ PI, Norton™ TH and Kaptrex™ for example. These materials are available as films and are not suitable for laser welding; textiles comprising these materials must therefore be joined to the seaming element by means of an adhesive, chemically reactive system or other suitable bonding methods.

Where the seaming element is joined to the industrial textile by through transmission laser welding (TTLW), an energy absorbent material must be located at the interface between the parts to be welded. This material can be applied as a liquid to one or both parts, or may be located as a solid in film or filament form between the parts. Suitable energy absorbents include carbon black, or dyeable products such as Clearweld® (available from Gentex Corporation of Carbondale, Pa.) or Lumogen® (available from Basf Corporation). The seaming element may be made from a bi-axially oriented, co-extruded material film including: i) a first thermoplastic polymer that is effectively transparent to laser energy; and ii) a second thermoplastic polymer that includes a suitable laser energy absorbent material additive.

In such a construction, the transparent film layer is made sufficiently thin such that there is no undue attenuation of the radiation so that sufficient radiation is transmitted through to the second layer so as to melt it through its thickness to provide the necessary weld. For example, if the overall thickness of the co-extruded film ranges from 100 µm to about 500 µm, and the thickness of the energy absorbent layer is 5%-15% of this total, then the thickness of the transparent layer must be between from 85-95 µm (for total film thickness of 100 µm) and 475-425 µm (for thickness 500 µm).

One second layer, which is co-extruded with and joined with the first to form a single structure, comprises a second film or filament forming thermoplastic polymer which is capable of forming a sufficiently strong bond with the first polymer in the first layer so as to minimize depolymerization at the locus of subsequent welds. The second polymer may, but need not, be the same as the first, but should be at least partially miscible and compatible, with the first polymer forming the first layer, and may have a similar melt viscosity and melt temperature to that of the first polymer. The first and second polymers may be the same; in addition, the first and second polymers may both be polyesters such as, but not limited to, PET. Where polyesters are used, they are preferably hydrolytically stabilized so as to resist depolymerization, and are provided at an intrinsic viscosity of at least 0.5 or more.

The second polymer contains a suitable laser energy absorbent material additive which may be uniformly incorporated into and dispersed within the polymer during a melt blending process and is present in an amount sufficient to render the second film layer weld-enabling during a subsequent TTLW process. A particularly suitable additive may be carbon black; however, other additives such as clear or dyeable products e.g. Clearweld® (available from Gentex Corporation of Carbondale, Pa.) or Lumogen® (available from Basf Corporation) may also be suitable, depending on the intended end use. Appropriate amounts of the additive will depend on the additive selected, but where the additive is carbon black, it may be present in amounts ranging from about 0.1% pbw to about 1.0% pbw (parts by weight) based on the total weight of the second polymer The foregoing summarizes the principal features of the seaming element and some of its optional aspects. The insert may be further understood by the detailed description of the embodiments which follow.

BRIEF DESCRIPTION OF THE DRAWINGS

FIG. 3 is a rear view of the seaming element of FIG. 1.

FIG. 4 is an enlarged partial rear view of the seaming element of FIG. 3.

FIG. 9 is a rear view of a fourth embodiment of a seaming element.

FIG. 10 is a rear view of a fifth embodiment of a seaming element.

DETAILED DESCRIPTION

Figure 1:
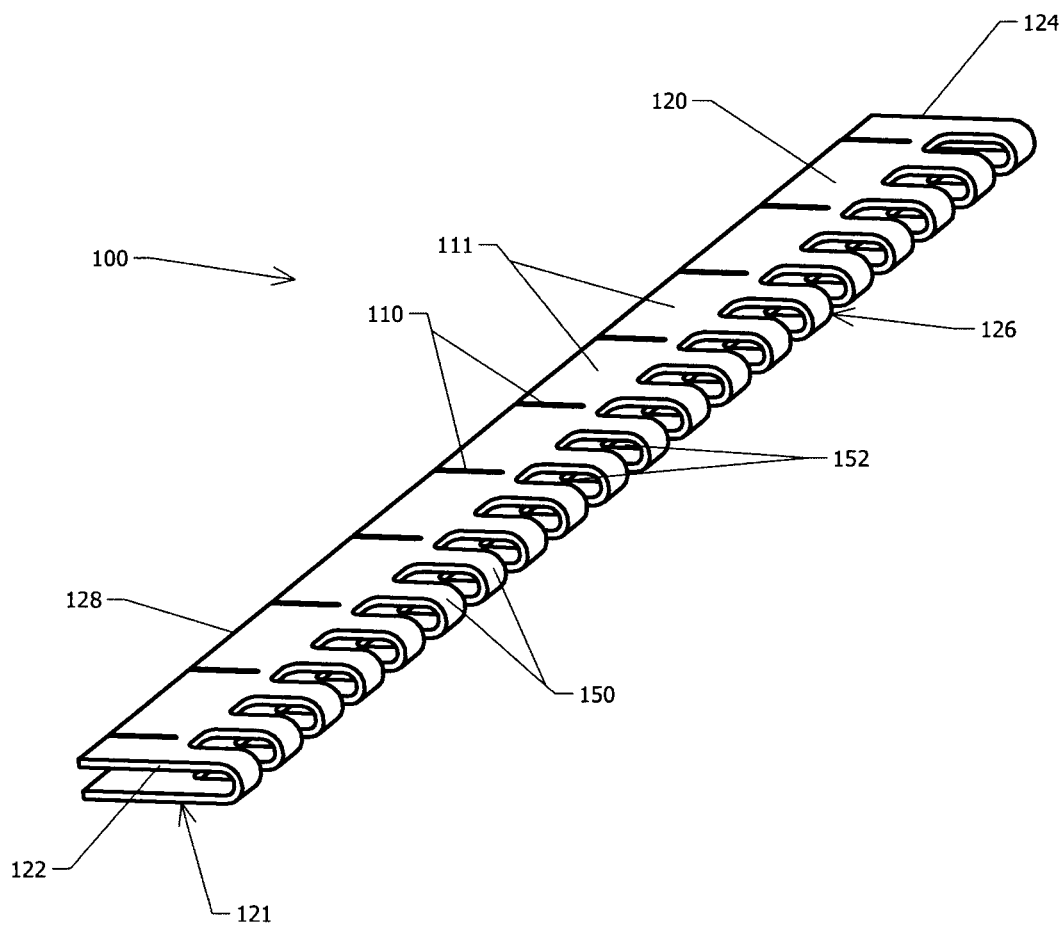
FIG. 1 is a perspective view of a first embodiment of a seaming element.

Wherever ranges of values are referenced within this specification, sub ranges therein are intended to be included within the scope of the disclosure unless otherwise indicated. Where characteristics are attributed to one or another variant, unless otherwise indicated, such characteristics are intended to apply to all other variants where such characteristics are appropriate or compatible with such other variants.

The following is given by way of illustration only and is not to be considered limitative. Many apparent variations are possible without departing from the spirit and scope of the invention.

FIGS. 1 to 5 illustrate a first embodiment of a seaming element. Referring first to the perspective view in FIG. 1, seaming element 100 has top member 120, bottom member 121, first lateral edge 122, second lateral edge 124, leading edge 126 and trailing edge 128. Seaming element 100 further includes along its leading edge 126 a plurality of protrusions 150 between which are located apertures 152. Apertures 152 and protrusions 150 are dimensioned such that protrusions 150 on a first seaming element 100 will fit into and interdigitate with corresponding apertures 152 and protrusions 150 on a second seaming element 100. In this manner, the two interdigitated seaming elements provide an interior channel to accommodate a conventional seaming member, such as a joining wire or pintle (not shown), to close the seam. Apertures 152 extend into the body of seaming element 100 to allow corresponding protrusions 150 from the second seaming element to be located in the desired position within these apertures 152.

Seaming element 100 includes a plurality of regularly spaced longitudinal slits 110, each of which is arranged perpendicularly to trailing edge 128 along both top member 120 and bottom member 121. While the slits (110) are illustrated as being perpendicular to the trailing edge (128), it is understood that other orientations are possible. Furthermore, the slits may be randomly spaced. In addition, it is possible to have slits on one or both members (120, 121). These variations are discussed below. Slits 110 extend from trailing edge 128 inwards a selected distance towards leading edge 126. Slits 110 extend through the thickness of the respective one of top member 120 and bottom member 121. In other embodiments (discussed below) the slits may extend partially through the thickness of the member.

As seen in FIGS. 1 through 5, the slits in top member 120 are located in alternating, offset relation to those in bottom member 121. Top and bottom members 120, 121 of seaming element 100 are thus evenly divided into a plurality of compliant tabs 111 located between and separated and defined by the slits 110. In this embodiment, slits 110 are aligned with the centre of every second aperture 152 in each of top and bottom members 120, 121, as shown more clearly in FIG. 4. It should be noted that the slits may be aligned away from the centre of the aperture in other embodiments. Thus, every tab 111 has a width equal to the distance between two apertures 152 and two protrusions 150, as is shown more clearly in FIG. 2.

Figure 2:
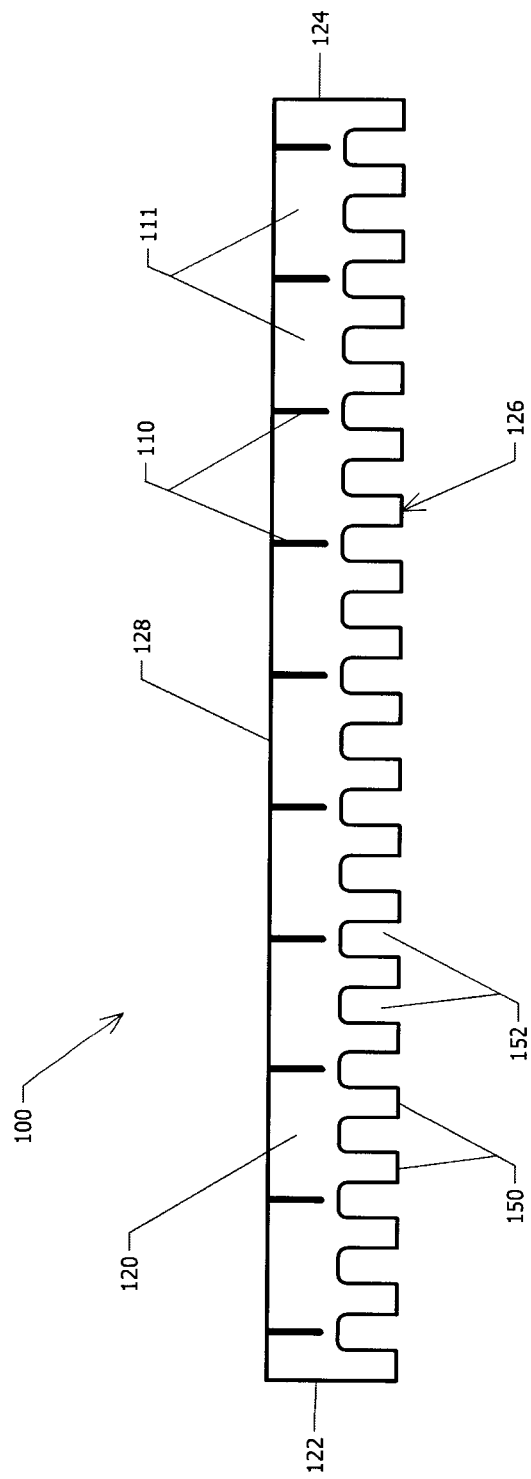
FIG. 2 is a top view of the seaming element shown in FIG. 1.

FIG. 2 is a top view of top member 120 of seaming element 100, showing slits 110a and compliant tabs 111a (FIG. 3). In FIGS. 2-5, the tabs and slits of the upper member are denoted by 'a', while those of the lower member are denoted by 'b'. Slits 110a are regularly spaced apart from each other, are each of the same length, and each is located to be aligned with every second aperture 152 in element 100.

FIG. 3 is a rear view of seaming element 100 shown in FIGS. 1 and 2, taken towards trailing edge 128 and showing slits 110a in top member 120 arranged in staggered relation to corresponding slits 110b in bottom member 121. Slits 110a and 110b provide compliant tabs 111a and 111b in each of top and bottom members 120, 121. An enlarged area of part of seaming element 100 is shown in greater detail in FIG. 4.

FIG. 4 is an enlarged partial rear view of seaming element 100 as shown in FIG. 3, showing tabs 111a in top member 120 and 111b in bottom member 121. Between top member 120 and bottom member 121, are protrusions 150, located between respective ones of slits 110a and 110b. These slits are aligned with the centre of the respective apertures 152.

Figure 5:
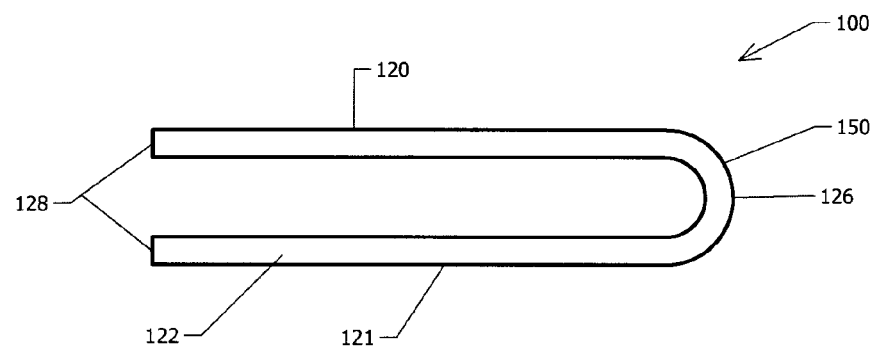
FIG. 5 is a side view of the seaming element shown in FIGS. 1 to 4.

FIG. 5 is a side view of seaming element 100 shown in FIGS. 1 to 4, showing first lateral edge 122, which is identical to second lateral edge 124 (see FIG. 1). In FIG. 5, leading edge 126 including representative protrusion 150, trailing edge 128, top member 120 and bottom member 121 of seaming element 100 are shown. Seaming element 100 has a generally "U" shaped configuration when viewed from either first or second lateral edge 122 or 124.

Figure 6:
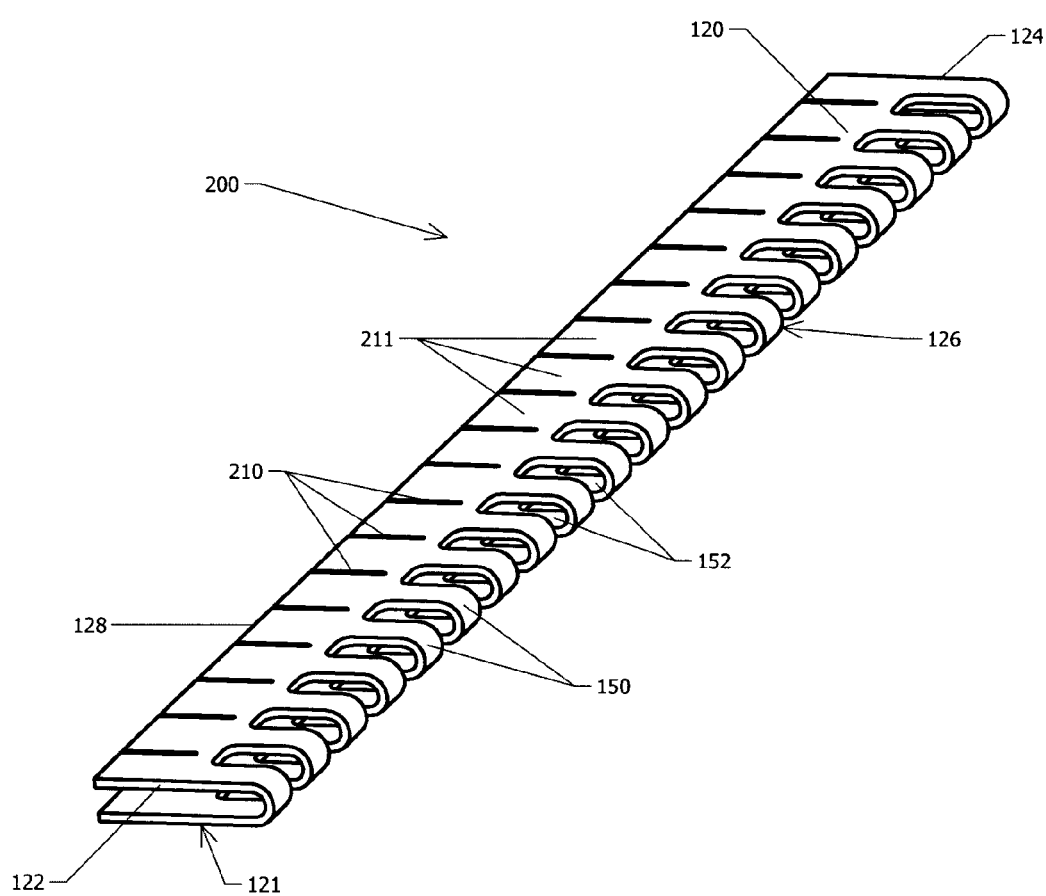
FIG. 6 is a perspective view of a second embodiment of a seaming element.
Figure 7:
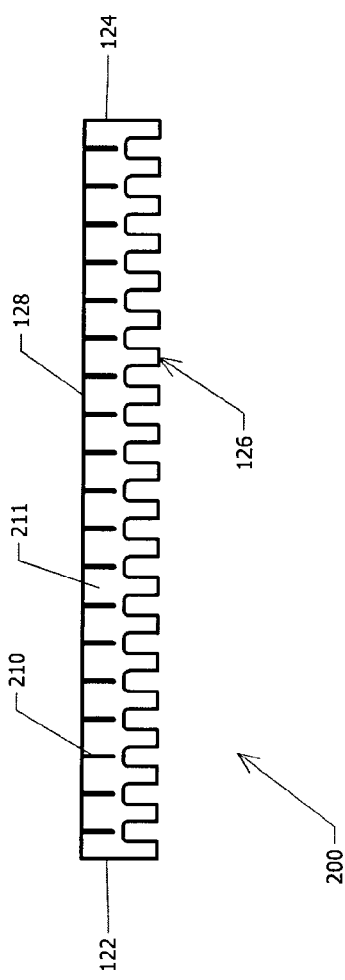
FIG. 7 is a top view of the seaming element shown in FIG. 6.

Referring to FIGS. 6 and 7, FIG. 6 is a perspective view of a seaming element 200 constructed and arranged according to a second embodiment, in which like parts have the same numbering as in the first embodiment, shown in FIGS. 1 to 5. FIG. 7 is a top view of seaming element 200. Seaming element 200 includes top member 120, bottom member 121, first lateral edge 122, second lateral edge 124, leading edge 126 and trailing edge 128.

In this embodiment, each of the regularly spaced slits 210 in each of top and bottom members 120, 121 is aligned with the centre of every aperture 152. Here, slits 210 in top member 120 are each aligned with slits 210 in bottom member 121, thereby providing a plurality of compliant tabs 211, in each of top and bottom members 120, 121. Tabs 211 each have a width equal to the total width of one aperture and one protrusion.

It is not necessary that each of the top member 120 and bottom member 121 be provided with the same pattern of slits and tabs. The slitting pattern shown in FIGS. 1 to 5 for example, may be provided to bottom member 121 while top member 120 is configured as shown in FIGS. 6 and 7. Other combinations of slitting patterns for each of top and bottom members 120, 121 are possible, and can be selected according to various factors, such as the intended end use of the textile in which the seaming element will be used, and the materials of construction.

The slits may be provided to seaming elements having any desired configuration for the forward portion adjacent to the leading edge, and to various configurations for the top and bottom members in the region adjacent the trailing edge. Such configurations would include, but not be limited to, those of the seaming elements of the prior art discussed above.

Figure 8:
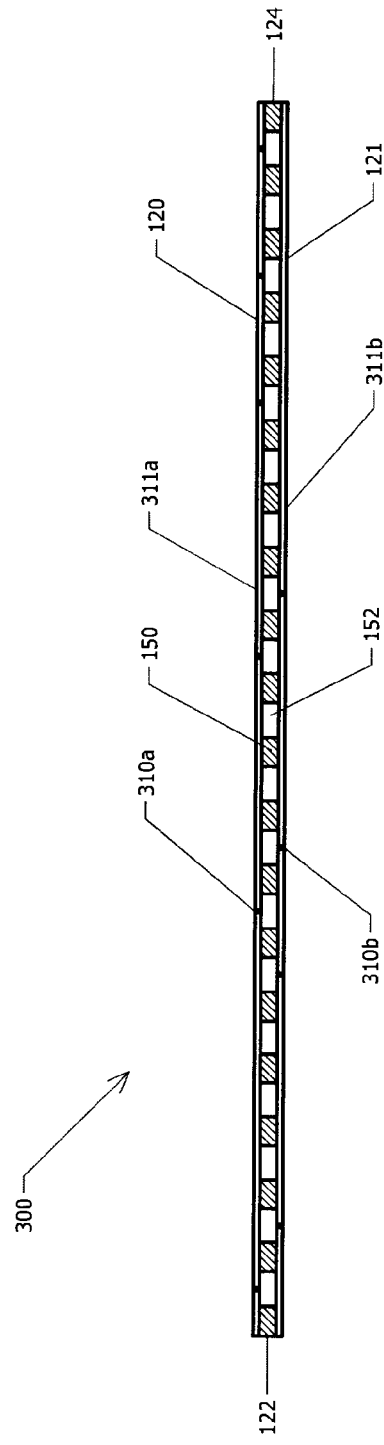
FIG. 8 is a rear view of a third embodiment of a seaming element.

FIG. 8 illustrates an embodiment of a seaming element (300) in which the slits (310a, 310b) are randomly spaced along the width of the respective member (120, 121). In FIG. 8, like parts have the same numbering as shown in FIGS. 1 through 5. Therefore, compliant tabs 311a have unequal widths; the same applies for compliant tabs 311b. Furthermore, while slits 310a and 310b are aligned with the centre of selected apertures 152, the distance between successive slits 310a differs from that between successive slits 310b.

FIG. 9 illustrates an embodiment of a seaming element 400 that includes partial slits (410a, 410b) in each of the upper and lower members (120, 121).). In FIG. 9, like parts have the same numbering as shown in FIGS. 1 through 5. Slits 310a and 310b extend part way through the thickness of the respective members 120 and 121. Such partial slits allow for any of the compliant tabs 411a, 411b to become detached from those adjacent so as to follow the surface contours of the textile to which the seaming element is attached. As in the other embodiments, the compliant tabs ensure intimate contact between the textile surface and the seaming element during a TTLW process.

While partial slits 410a are in an alternating offset relation to partial slits 410b, and are aligned with the center of every second aperture 152, it is understood that the placement of the partial slits can take on any regular pattern or randomized placement as previously described.

FIG. 10 shows an embodiment of a seaming element (500) in which the slits 510a are provided on only one member (120) of the element. Seaming element 500 includes a plurality of regularly spaced longitudinal slits 510a arranged perpendicularly to the trailing edge of the seaming element and along top member 120. As with the previous embodiments, slits 510a can have a regular pattern across the width of the element, or can be placed randomly. In addition, slits 510a may be partial (as shown in FIG. 9). Bottom member 121 does not contain any slits.

FIGS. 11 to 14 illustrate another embodiment of a seaming element 800 which has an edge region 25a in top member 820, and corresponding edge region 25b (shown in FIG. 14) in bottom member 821. Edge regions 25a, 25b are located in opposed parallel relation so that ridge regions 30a, 30*b* formed between shoulders 35*a*, 36*a*, and 35*b*, 36*b* respectively are located directly above one another in seaming element 800.

Seaming element 800 includes top member 820, bottom member 821, first lateral edge 822, second lateral edge 824 (see FIG. 12), leading edge 826 and trailing edge 828. Seaming element 800 further includes along leading edge 826 a plurality of protrusions 150 between which are located apertures 152, to provide for the joining of opposing pairs of seaming elements in the manner described above in relation to the previous embodiments.

In this embodiment, seaming element 800 includes a plurality of regularly spaced longitudinal slits 810 arranged perpendicularly to trailing edge 828 and provided to top member 820 and bottom member 821. Slits 810 extend from trailing edge 828 inwards through edge region 25*a* (and corresponding edge region 25*b* on bottom member 821, shown in FIG. 14) a selected distance towards leading edge 826, which distance extends through shoulders 36*a*, 36*b*. Slits 810 in top member 820 extend through the thickness of the respective one of top member 820 and bottom member 821, and slits 810 in top member 120 are located in alternating, offset relation to those in bottom member 821. Top and bottom members 820, 821 of seaming element 800 are thus evenly divided into a plurality of compliant tabs 811 located between each slit 810, which are aligned with the centre of every second aperture 152 on each of top and bottom members 820, 821, as is shown most clearly in FIG. 12. Tabs 811 thus have a width equal to the distance between two apertures 152 and two protrusions 150.

Figure 12:
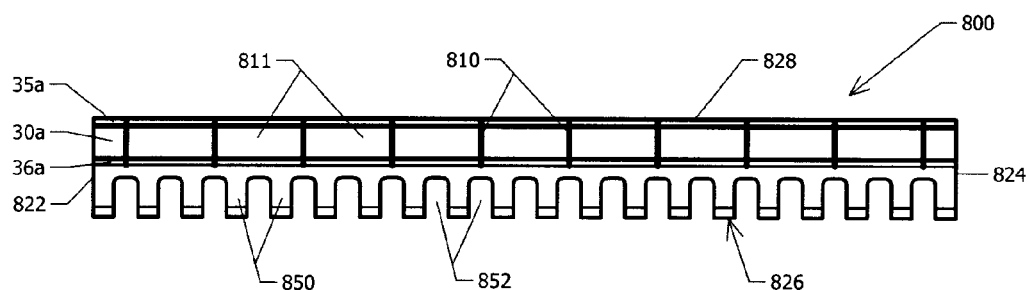
FIG. 12 is a top view of the seaming element shown in FIG. 11.

FIG. 12 is a top view of top member 820 of seaming element 800, showing slits 810 and compliant tabs 811. Top member 820 includes shoulders 35*a*, 36*a* located on either side of ridge region 30*a*, and is shaped so as to be essentially identical to bottom member 821 except that slits 810 are located in offset relation to corresponding slits 810 in bottom member 821. Slits 810 are regularly spaced from each other, are each of the same length, and each is aligned with every second aperture 152 in seaming element 800.

Figure 11:
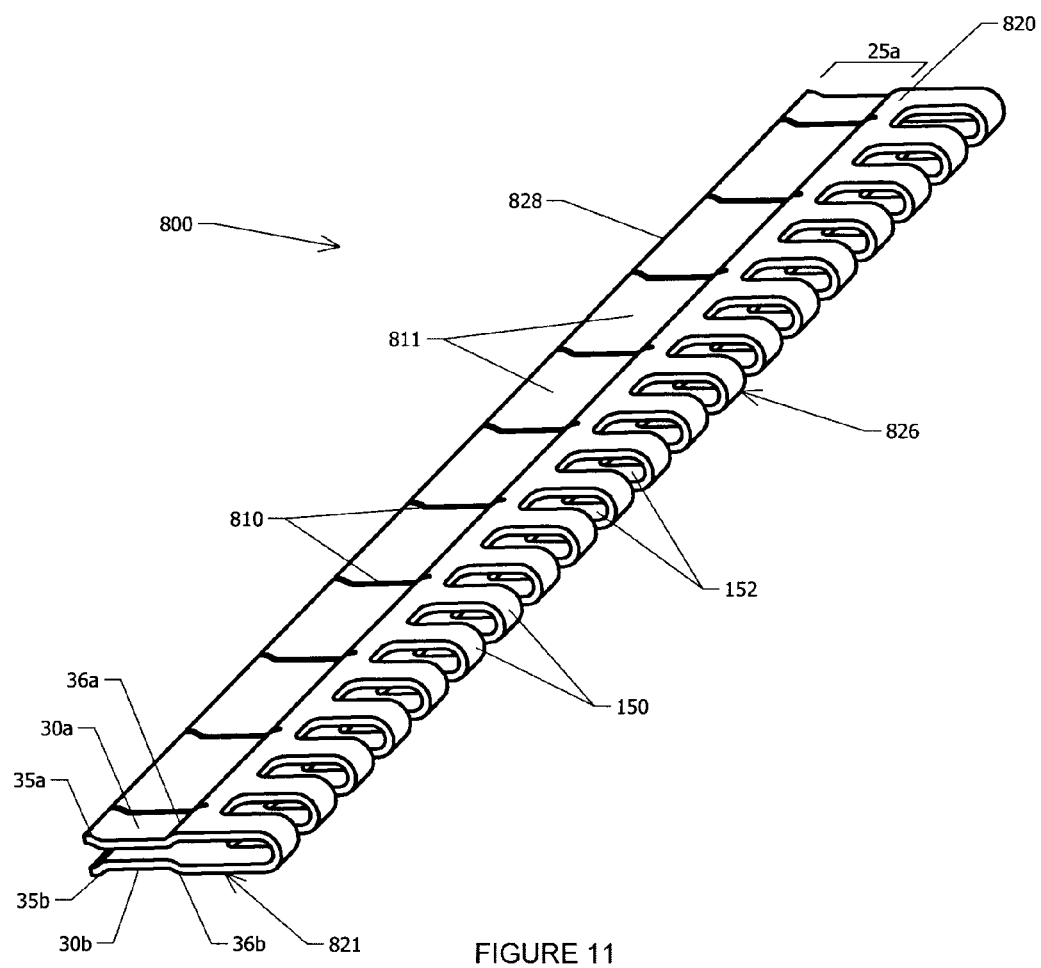
FIG. 11 is a perspective view of a sixth embodiment of a seaming element.
Figure 13:
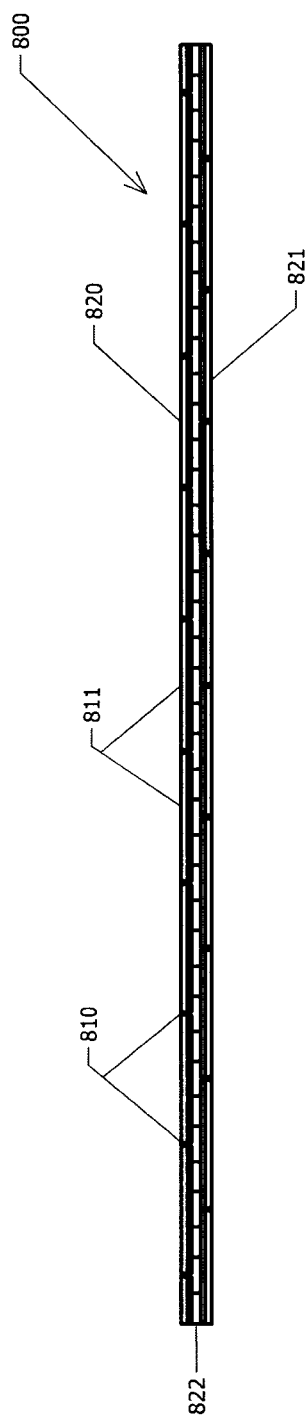
FIG. 13 is a rear view of the seaming element of FIG. 11.

FIG. 13 is a rear view of seaming element 800 shown in FIGS. 11 and 12, taken towards trailing edge 828 and showing slits 810 in each of top member 820 and bottom member 821, slits 810 in top member 820 being offset in relation to corresponding slits 810 in bottom member 821, to provide compliant tabs 811 in each of top and bottom members 820, 821.

Figure 14:
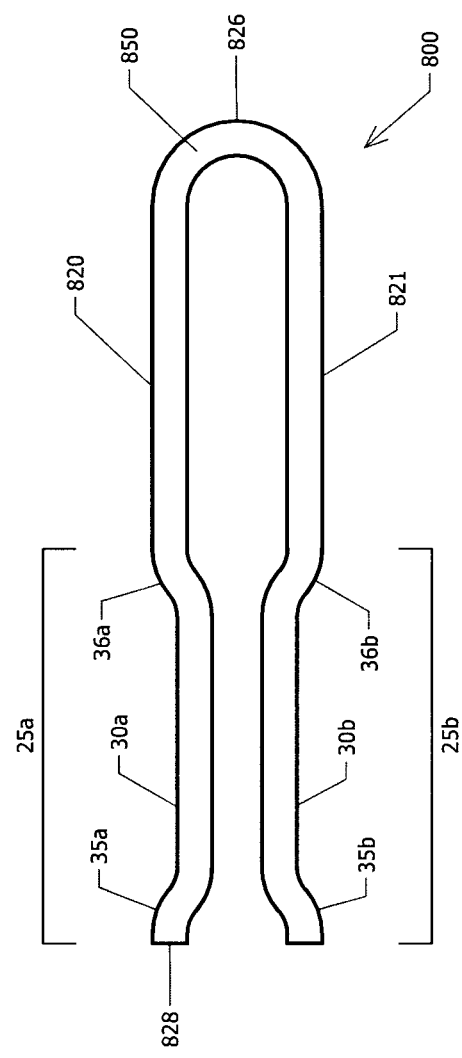
FIG. 14 is a side view of the seaming element shown in FIGS. 11 to 13.

FIG. 14 is an end view of seaming element 800, showing first lateral edge 822, and second lateral edge 124 (see FIG. 11). In FIG. 14, leading edge 826 including representative protrusion 150, trailing edge 828, and top and bottom members 820 and 821 including regions 25*a* and 25*b* are shown. Seaming element 800 has a generally "U" shaped configuration when viewed from either first or second edge 822 or 824 and includes shoulders 35*a*, 35*b*, 36*a* and 36*b* and ridge regions 30*a* and 30*b*.

Figure 15:
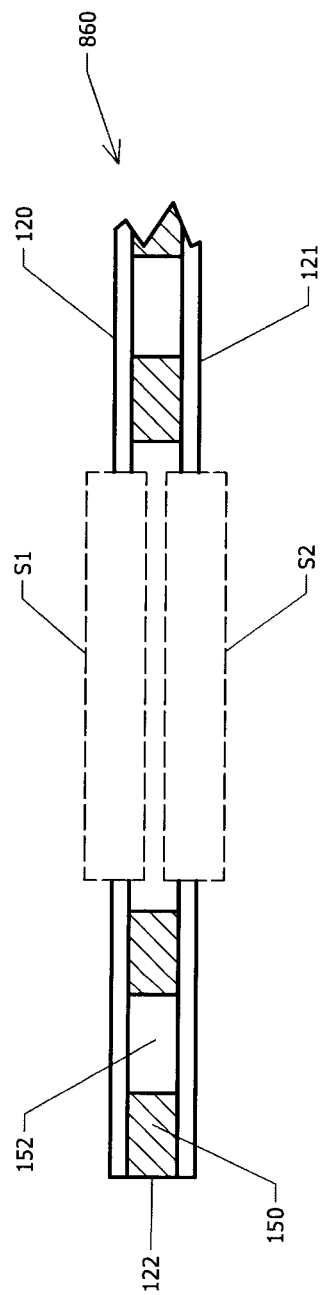
FIG. 15 illustrates a schematic for various slit arrangements in a seaming element

Independent variations of the positioning, depth and orientation of the slits is shown schematically in FIG. 15, in which a seaming element (860) having protrusions (150) and apertures (152) may have various combinations of slit orientations and arrangements in the upper and/or lower member (120, 121). The slit arrangements, as depicted by S1 and/or S2 may have the following independent features: the slit arrangements may be perpendicular to the leading edge, slanted, or have other orientations; may extend partially through the respective member, or extend fully through; may have regular or randomized spacing along the breadth of the member; and may be aligned centrally with selected apertures, or aligned in a position away from the central portion of selected apertures. Where slits are placed on both upper and lower members, the slit arrangement as depicted by S1 may be independent of that depicted by S2. Alternatively S1 and S2 may be coordinated in any manner. For example, the arrangements S1 and S2 may be identical, or the slit arrangements may be offset relative to each other.

Figure 16:
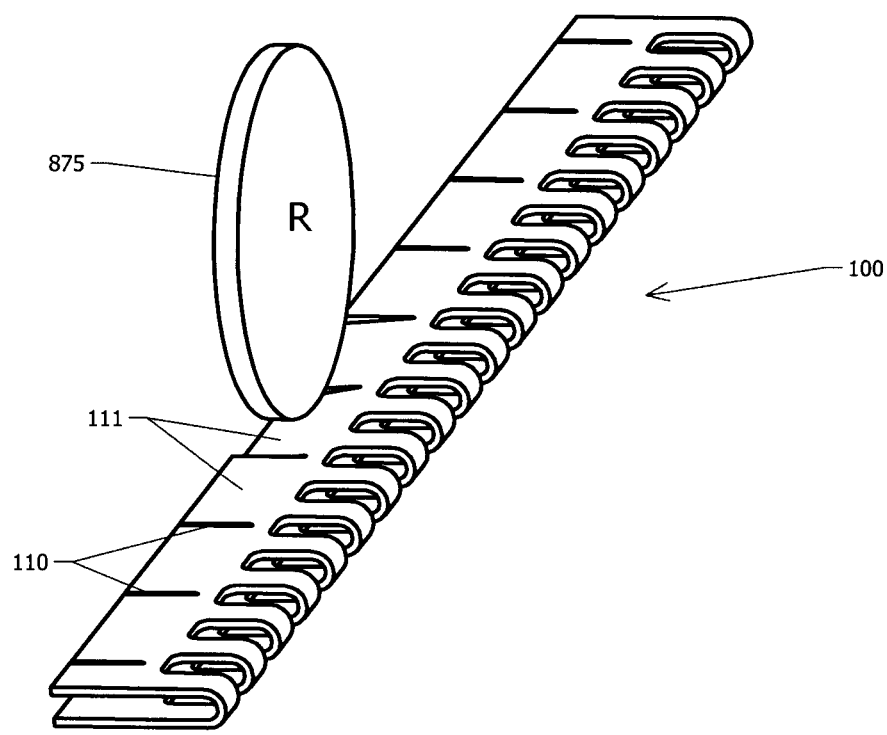
FIG. 16 is a perspective view of the seaming element of FIG. 1 during a roller type laser operation.

FIG. 16 is a schematic perspective representation of a seaming element 100, during a roller type TTLW operation, during which a roller head R of a laser welding tool (875) is passed over tabs 111 in sequence under pressure. FIG. 16 shows the compliancy of the tabs 111 due to the slits 110 in the element. This compliancy assures, to the greatest extent possible, an intimate contact between the surfaces of the tabs and the fabric to which the seaming element is to be welded in, for example a through transmission laser welding process. The roller type laser operation shown in FIG. 16 applies to other variations of the seaming element, as shown, for example, in FIGS. 6 through 14.

Figure 17A:
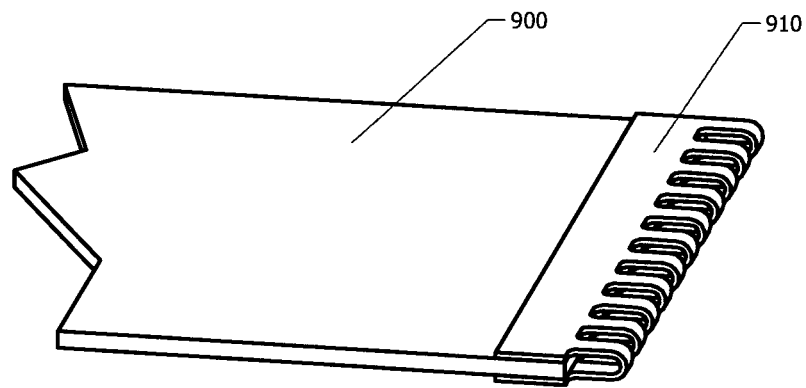
FIGS. 17a and 17b illustrate sequential steps for the placement of slits onto a seaming element attached to a fabric.
Figure 17B:
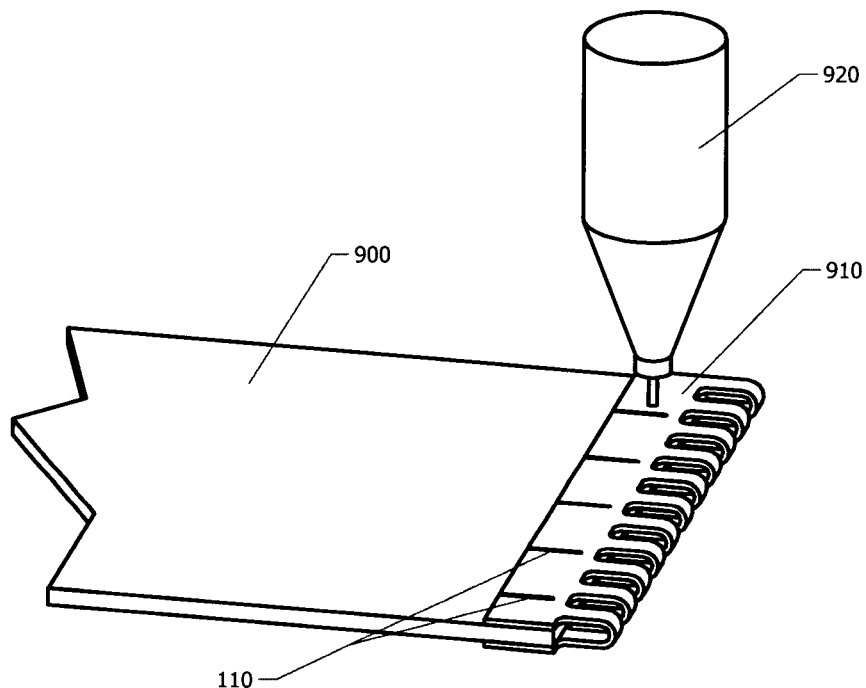

FIG. 17*a* shows a seaming element 910 without any compliant tabs or slits, which has been attached in an earlier bonding or TTLW process to a first seamable end of an industrial textile 900. Following attachment to the textile 900, slits 110 are placed onto the seaming element 910. Laser tool 920 (which is different from that used in a TTLW process) can be used to cut slits 110 in one or both members of the seaming element. The laser tool 920 can be, for example a $CO_2$ laser. The process is carried out as follows: the textile 900 and attached seaming element 910 are laid flat; the laser tool 920 is brought into position and adjusted to cut one or more slits 110 of desired thickness through the surface of one or both members of the seaming element. The laser tool 920 can be adjusted such that the slit 910 extends either partway, or completely through the surface of the seaming element. The position of the slits 110 can be made regular or randomized in the manner previously described. After the desired number of slits have been cut into one surface of the element, if desired, both the seaming element and the textile to which it is attached are turned over and the cutting process is repeated on the second surface. In this manner, the seaming element can be provided with a plurality of compliant tabs on one or both members.

Where the textile 900 is nonwoven (for example, a film), the slits 110 can extend completely through both the seaming element 910 and textile 900. In this case, there is no need to turn over the assembled seaming element and film in order to make slits on the second member. As with the nonwoven textile, the position of the slits 110 can be made regular or randomized in the manner previously described.

Slitting the seaming element 910 following its attachment to the seamable edge of a textile 900 will not affect its compliancy. However, it will change the fracture mechanics and stress distribution of the bonded/welded area, particularly when attached to a nonwoven film type textile. This is because the slits imparted to both the element 910 and the nonwoven textile 900 will cause applied stresses to be distributed in a manner somewhat similar to that found in a comparable weld or bond onto a woven structure. By slitting both the seaming element 910 and a nonwoven textile material 900 following bonding, the resulting join is now able to distribute stress over a plurality of discrete fabric components, rather than a continuous sheet or film, and may thus evidence a higher strength and improved durability.

CONCLUSION

The foregoing has constituted a description of specific embodiments showing how the device may be applied and put into use. These embodiments are only exemplary. The device in its broadest, and more specific aspects, is further described and defined in the claims which now follow.

We claim:

1. A seaming element for bonding to an industrial textile, the seaming element having:
   (i) a first lateral edge;
   (ii) a second lateral edge;
   (iii) a trailing edge;
   (iv) a forward portion comprising a plurality of protruding seaming loops with successive loops spaced apart by an aperture; and
   (v) a rearward portion continuous with the forward portion, the rearward portion comprising an upper member and a lower member, the upper and lower members being substantially planar and having mutually opposed inner surfaces,
   wherein
   at least one of the upper and lower member comprises one or more slits between the first lateral edge and the second lateral edge, the one or more slits extending from the respective trailing edge in a direction towards the forward portion of the seaming element, the one or more slits is either evenly spaced or randomly spaced between the first lateral edge and second lateral edge, and at least one of the one or more slits extends completely through a thickness of the member; and
   the seaming element comprises a thermoplastic polymer.

2. The seaming element according to claim 1 wherein further comprising a radiant energy absorbent.

3. The seaming element according to claim 1, comprising a bi-axially oriented polyester.

4. The seaming element according to claim 1, wherein each of the one or more slits has a substantially linear configuration and extends substantially normal to the respective trailing edge.

5. The seaming element according to claim 1, wherein at least one slit is centrally aligned with one aperture.

6. The seaming element according to claim 5, wherein each of the upper and lower members comprises one or more slits; and each of the one or more slits is centrally aligned with a selected one of the apertures.

7. The seaming element according to claim 1, wherein each of the upper and lower members comprises one or more slits; each slit of the upper member is aligned with a selected one of the slits of the lower member, and each slit of the lower member is aligned with a selected one of the slits of the upper member.

8. The seaming element according to claim 1, wherein each of the upper and lower members comprises one or more slits; and each slit of the upper member is symmetrically laterally offset from an adjacent pair of slits of the lower member.

9. An assembly of a seaming element and an industrial textile, the industrial textile having opposed first and second seamable edge regions, the seaming element having:
   (i) a first lateral edge;
   (ii) a second lateral edge;
   (iii) a trailing edge;
   (iv) a forward portion comprising a plurality of protruding seaming loops with successive loops spaced apart by an aperture; and
   (v) a rearward portion continuous with the forward portion, the rearward portion comprising an upper member and a lower member, the upper and lower members being substantially planar and having mutually opposed inner surfaces, with a portion of each inner surface bonded to the industrial textile at a selected one of the first and second seamable edge regions;
   wherein:
   at least one of the upper and lower member comprises one or more slits between the first lateral edge and the second lateral edge, the one or more slits extending from the respective trailing edge in a direction towards the forward portion of the seaming element;
   the one or more slits is either evenly spaced or randomly spaced between the first lateral edge and second lateral edge; and
   each of the upper and lower members of the seaming element is bonded to the seamable edge region by a bonding method selected from the group consisting of chemically reactive systems, adhesives, laser beam welding, and ultrasonic welding.

10. The assembly according to claim 9, wherein at least one of the seaming element and the industrial textile comprises a polymer selected from one of a thermoplastic polymer or a thermoset polymer.

11. The assembly according to claim 10, wherein the thermoplastic is a polyester further comprising a radiant energy absorbent.

12. The assembly according to claim 11, wherein in the seaming element, the first seamable edge region and the second seamable edge region each comprise a thermoplastic; the seaming element and/or the industrial textile comprises an energy absorbent; and the seaming element is bonded to the first and second seamable edge regions by through transmission laser welding.

13. The assembly according to claim 9, wherein each of the one or more slits has a substantially linear configuration and extends substantially normal to the respective trailing edge.

14. The assembly according to claim 9, wherein at least one slit extends partially through a thickness of the member.

15. The assembly according to claim 9 wherein at least one slit extends completely through a thickness of the member.

16. The assembly according to claim 9, wherein at least one slit is centrally aligned with one aperture.

17. The assembly according to claim 16, wherein: each of the upper and lower members comprises one or more slits; and each of the one or more slits is centrally aligned with a selected one of the apertures.

18. The assembly according to claim 9, wherein each of the upper and lower members comprises one or more slits; each slit of the upper member is aligned with a selected one of the slits of the lower member, and each slit of the lower member is aligned with a selected one of the slits of the upper member.

19. The assembly according to claim 9, wherein each of the upper and lower members comprises one or more slits; and each slit of the upper member is symmetrically laterally offset from an adjacent pair of slits of the lower member.

* * * * *